(No Model.) 3 Sheets—Sheet 1.
S. L. HEYWOOD.
VARIABLE DIRECTION AND SPEED DEVICE.
No. 581,286. Patented Apr. 27, 1897.
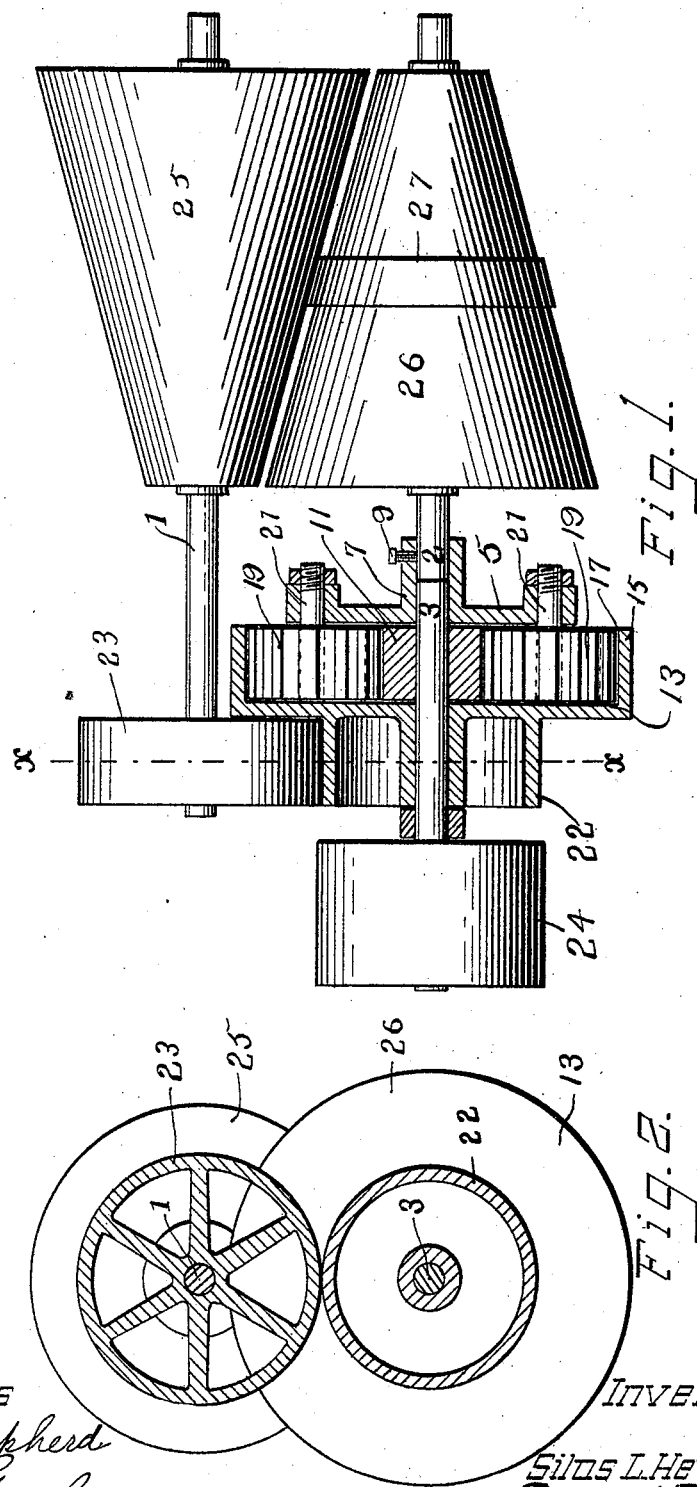

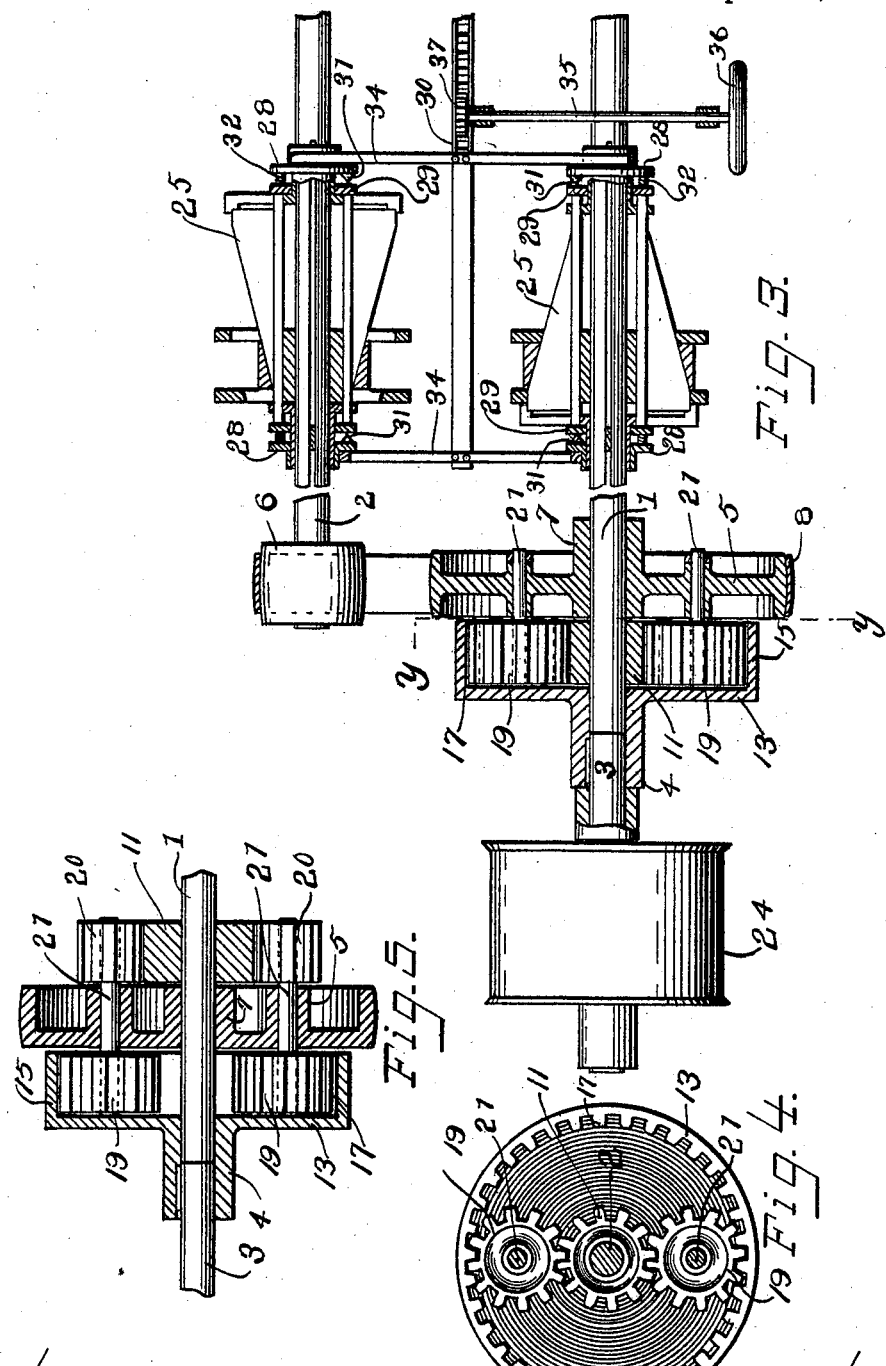

(No Model.)  3 Sheets—Sheet 3.

S. L. HEYWOOD.
VARIABLE DIRECTION AND SPEED DEVICE.

No. 581,286.  Patented Apr. 27, 1897.

Witnesses:
C. E. VanDorn
M. E. Gooley

Inventor:
Silas L. Heywood.
By Paul O. Hawley
his Attorneys.

UNITED STATES PATENT OFFICE.

SILAS L. HEYWOOD, OF MINNEAPOLIS, MINNESOTA.

VARIABLE DIRECTION AND SPEED DEVICE.

SPECIFICATION forming part of Letters Patent No. 581,286, dated April 27, 1897.

Application filed April 27, 1896. Serial No. 589,285. (No model.)

*To all whom it may concern:*

Be it known that I, SILAS L. HEYWOOD, of the city of Minneapolis, county of Hennepin, State of Minnesota, have invented certain new and useful Improvements in Variable Direction and Speed Devices, of which the following is a specification.

My invention relates to a variable-speed device in which the direction of movement may be reversed at will; and the invention consists in certain improvements upon the device for which Letters Patent of the United States were issued to me on the 11th day of December, 1894, No. 530,588.

The objects of the present invention are to simplify the construction of the device shown and described in my former patent above referred to and to render the means employed as compact and as easy of operation as possible.

Figure 6:
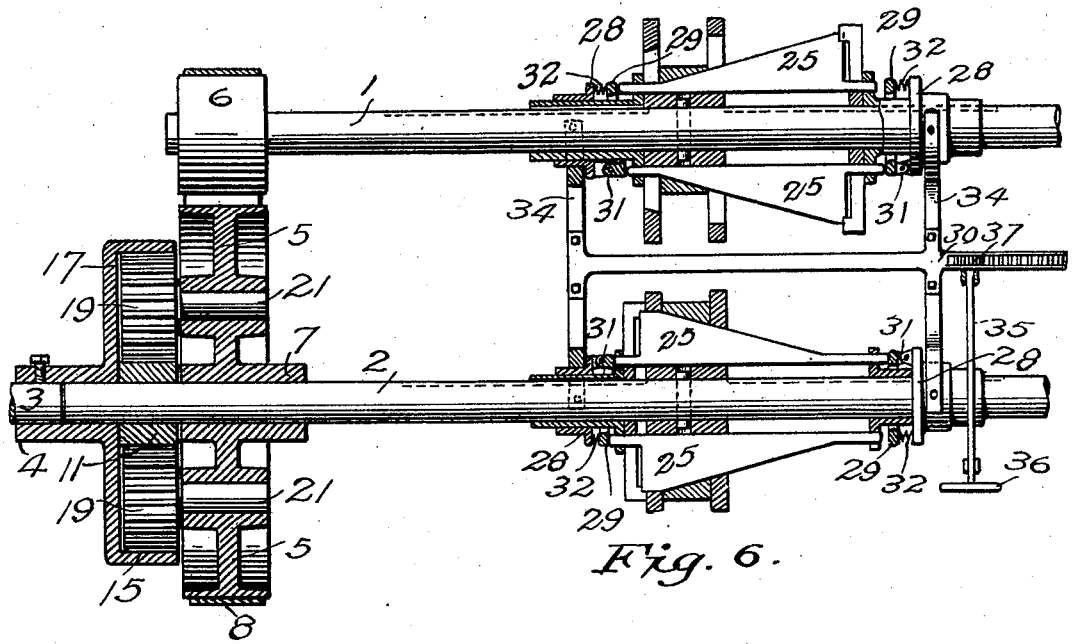
Figure 7:
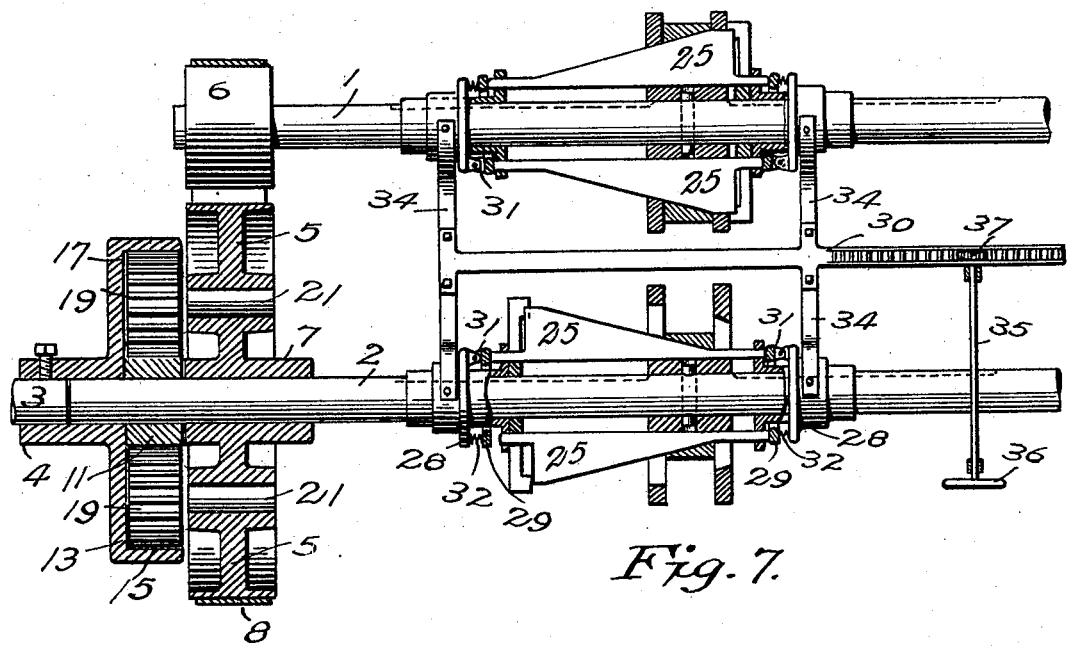

In the accompanying drawings, forming part of this specification, Figure 1 is a plan view, partly in section, of my improved device. Fig. 2 is a transverse section on line $x\ x$ of Fig. 1. Fig. 3 is a sectional view showing a modified form of the device. Fig. 4 is a transverse section on line $y\ y$ of Fig. 3. Fig. 5 shows a modified arrangement of the planetary gears. Fig. 6 is an enlarged detail view taken from Fig. 3. Fig. 7 is a similar view showing the relative changes in the variable pulleys.

In the drawings I have shown two parallel lines of shafting connected by belts or gearing. One shaft (marked 1 in the drawings) is formed in a single section. The other is formed in two sections arranged end to end and marked 2 and 3. Secured upon the section 2 is a wheel 5, having a hub 7 into which the ends of the sectional shafts 2 and 3 both extend. This wheel is secured to the shaft 2 by a set-screw 9. The hub 7 serves as a coupling for the sections 2 and 3 of the shaft. This hub is securely fastened to the end of the shaft 2, while the shaft 3 is free to revolve therein. A small gear or pinion 11 is secured to the shaft 3, and a large wheel 13 is mounted loosely upon the shaft 3. This wheel has a rim 15, projecting from one side of the main disk of the wheel, and this rim is in the form of an internal gear, being provided with a series of teeth 17. Small gears 19 are mounted upon studs 21, secured in the wheel 5, and these gears mesh both with the gear or pinion 11 and with the internal gear-teeth 17 upon the wheel 13, thereby forming a planetary gear similar to that described in my former patent. The wheel 13 has constructed integrally with it or secured to it the gear-wheel 22, which may be, as here shown, in the form of a friction gear or pulley, or it may be in the form of an ordinary toothed gear. The gear 22 connects with a similar gear 23 upon the shaft 1.

24 is a shaft or pulley fast upon the shaft 3, to which it is desired to impart motion in variable direction and at variable speeds.

25 is a cone-pulley upon the shaft 1, and 26 a cone-pulley upon the shaft 2. These pulleys are placed nearly in contact, with a belt 27 running between them, as shown in Fig. 1, or these pulleys might be arranged farther apart, in a well-known manner, with a belt running around them both. Suitable provision in either instance is made for shifting the belt longitudinally on the pulleys. The connection between the pulleys 25 and 26 and between the friction pulleys or gears 22 and 23 must be made in a corresponding manner, so that the wheels 5 and 13 will revolve in the same direction.

Motion may be imparted to the device by a belt from a suitable source of power applied to the rim 15 of the wheel 13, or it might be applied to one of the shafts 1 or 2. If, for instance, the wheel or gear 11 on the section 3 of the main shaft is one-fourth the diameter of the internal gear 17, and the diameter of the gear or friction pulley 22 is to that of friction pulley or gear 23 as four to five, and the larger end of the cone-pulley 26 to the small end of the cone-pulley 25 as four to three, and the smaller end of cone-pulley 25 to the larger end of 26 as four to five, then if the belt connecting the cone-pulleys 25 and 26 be adjusted to the point where the two pulleys are of equal size the gear or pinion 11 with its connections will be held stationary. If the belt 27 be shifted to the large end of the cone-pulley 26 and the small end of cone-pulley 25, the wheel or gear 11 with its connections will revolve in the opposite direction to the internal gear 4 and at an equal speed. If the belt 27 is shifted, so as to make connection between the small end of the cone-pulley 26 and the large end of the cone-pulley 25, the pinion or gear 11 and the internal gear 17 will revolve in the same direction and at equal speed. By this means, therefore, any desired rate of speed in either direction may be given to the shaft 3 and its pulley or drum 24.

The construction shown in Fig. 3 is especially desirable where great power is desired, as in hoists, elevators, &c. In this construction two lines of shafting are employed, one line being in two sections, (marked 1 3,) as in Fig. 1. The wheel 5, carrying the planetary gearing or pinions 19, is mounted loosely upon the section 1 of the shaft. The small gear or pinion 11 is fast on section 1, and the wheel 13, having the internal gear 17, is provided with a large hub 4, which serves as a coupling for sections 1 and 3 of the shaft, being keyed to the section 3, while the section 1 turns freely therein. The section 3 is provided with a driving pulley or wheel 24. The shaft 2 is provided with a pulley 6, and a suitable belt 8 extends around the rim of the wheel 5 and around the pulley 6 on the shaft 2. Instead of using a belt for connecting these two wheels any other suitable connection, such as a chain or suitable gearing, might be used, it being only necessary that the motion of the wheel 5 and the gear or pinion 11 be in the same direction. For connecting the shafts 1 and 2 I employ a device for varying the relative speeds of two shafts, substantially as described in my former Letters Patent, hereinbefore referred to.

The operation of this modified form of device is as follows: Suppose, as in Fig. 1, that the small gear-wheel 11 be one-fourth the diameter of the internal gear 17, with which it is connected by the pinions 19 on the wheel 5, which is loose on section 1 of the shaft, and that the wheel or pulley 6 on the shaft 2 be one-fifth of the diameter of the wheel 5, with which it is properly connected by a belt or otherwise, then if the expansion-pulleys on the shafts 1 and 2 are adjusted to equal diameters the internal gear-wheel 17, shaft 3, and drum 24 will be stationary; but if the adjustment is such that the diameter of the operative parts of the expansion-pulleys 25 and 26 are as four to three and motion is given through the shaft 2 the internal gear 17, shaft 3, and drum 4 will turn in the same direction with the shaft 2 but at one-sixteenth of its rate of speed. If the proportion of the operative parts of the conical expansion-pulleys is as four to five, then the drum 24 will be driven in the reverse direction to the shaft 2 at one-sixteenth the rate of speed.

The devices herein described may also be used for converting a low rate of motion with great power into a high rate of motion. For example, if in Fig. 1 power is applied to the drum or pulley 24 there is practically no limit to the number of revolutions that may be obtained upon the wheel 13 for one revolution of the drum or pulley 24.

Instead of having one line of shafting in two sections, as shown, it may be continuous, in which case in Fig. 1 the cone-pulley 26 will be connected with the wheel 5 and the whole be loose upon the shaft, while in Fig. 2 the internal gear or wheel 13 will be loose upon the shaft and the drum 24 will also be loose upon the shaft and joined onto the hub 4 of the wheel 13 or be placed upon a parallel shaft and driven by a suitable intermediate gear from the hub 4 of the wheel 13.

In the construction of the expansion-pulleys shown in Figs. 3, 6, and 7, which operate in substantially the same manner as the expansion-pulleys described in my former patent, I have shown, instead of the longitudinally-movable inclined disks or cams shown in my former patent, parallel yielding disks or cams which come into use only when a heavy load is placed upon the pulleys. When the same are running light, the pulleys may be more quickly shifted or varied than with the cams or disks described in my said former patent. Each of these yielding or changeable cams is constituted by parallel disks 28 and 29. The part 28 is a collar loose on the shaft and fast upon the shifting device, so that it cannot revolve with the shaft. The other part 29 is a steel plate or ring which may or may not revolve with the shaft, as desired, it being only required that it be capable of inclination thereon. Upon the front or inner side of the part 28 is a solid bearing 31. The ring 29 may be pivoted to this, as clearly shown in Figs. 6 and 7, or simply laid over it. The construction shown is preferred. On the outer side is a spring or springs 32, against which the projecting ends of the wedges 25 will strike as they revolve with the shaft. If there is a load upon the pulleys, the outer wedges will be held snugly in place by the pressure of the belt, while those upon the inner side, being free from the belt, will move easily. These do move as they near and arrive opposite the solid bearing 31, while the ring or disk 29, yielding to the pressure of the outside wedges, inclines itself against the pressure of the springs 32 and forms a cam, the inclination of which is in exact proportion to the load upon the pulley. If there is no load upon the pulleys, it is obvious that the springs 32 will hold the rings or disks 39 perpendicular to the shaft, so that all the wedges would be forced back at once after the shifter was moved. The shifter hereinafter described carries all of the collars or disks 28 and has a movement equal to the necessary movement of the wedges 25.

I have not shown the belt running over the expansion-pulleys, as the same is fully described in my said former patent. For the purpose of operating the expansion-pulleys I provide the rack-bar 30, which takes the place of the shipper-rod in my former patent. This rack-bar is connected to the frame 34, which is connected to the disks 28. The rack-bar is preferably operated by a suitable shaft 35, having the hand-wheel 36 and a pinion 37, that meshes with the rack-bar 30.

In Fig. 5 I have shown the gear or pinion 11 arranged outside of the internal gear 17, with the studs 21 on the wheel 5 extended through to the opposite side of said wheel and having the pinions 20 mounted thereon. These pinions 20 mesh with the pinion or gear 11. This permits larger pinions 19 and 11 to be used than could be done if the pinions 19 were arranged to mesh directly with the pinion 11.

It will be seen that the construction is simpler and more compact than that described in my former patent. I here employ but two shafts, one of them, however, made in two sections, and in other features, as already described, the construction is made simpler and more compact and less expensive.

Having thus described my invention, I claim as new and desire to secure by Letters Patent—

1. The combination, with two parallel shafts and means for driving the same at variable speeds, one of said shafts being formed in two sections, of a planetary gearing on the shaft consisting of the internal gear-wheel 17, the small gear 11, the wheel 5 with the pinions 19 mounted thereon and engaging the gears 11 and 17, and means connecting said planetary gearing with the other shaft.

2. The combination, with the two parallel shafts, and means for driving them at variable speeds, of the internal gear-wheel 17, small gear or pinion 11 secured to the shaft upon which it is mounted, the wheel 5 mounted loosely upon its shaft and carrying the pinion or pinions 19 that mesh with the internal gear 17 and the small gear 11, and means connecting said wheel 5 with the other shaft, for the purpose set forth.

3. The combination, in a variable speed and direction device having expansion-pulleys, of parallel disks carrying suitable plates having solid bearings on one side and resting on springs on the other side, for the purpose set forth.

4. The combination, in a variable speed and direction device, with the expansion-pulleys, of the parallel disks 28, the plates 29 having solid bearings upon one side and resting upon springs upon the other side, and means for moving said disks and plates, for the purpose set forth.

5. In a variable direction and speed device, the combination, of parallel driving and driven shafts, with constant-direction but variable-speed devices provided upon and operatively connecting said driving and driven shafts, and a planetary-gear mechanism comprising three main parts or portions all carried upon or substantially concentric with one of said shafts, one portion thereof being connected to said shaft, another portion being driven from the other shaft and a third portion transmitting the movement, whereby the final or transmitted movement may be reversed, increased or decreased in speed, or caused to cease by varying the relative speeds of the driving and driven shafts and during the continuous rotation of said shafts, substantially as described.

6. In a variable direction and speed device, the combination, of parallel driving and driven shafts with variable-speed pulleys provided thereon and connected by a belt, and whereby said shafts are made constant as to direction of movement, and a planetary-gear mechanism comprising three main parts or portions, all carried upon or substantially concentric with one of said shafts, one portion of said gear being connected to said shaft, another portion being driven from the other shaft, and a third portion transmitting the movement, substantially as described.

In testimony whereof I have hereunto set my hand this 23d day of April, A. D. 1896.

SILAS L. HEYWOOD.

In presence of—
  A. C. PAUL,
  M. E. GOOLEY.